(12) United States Patent
Daup et al.

(10) Patent No.: US 11,441,963 B1
(45) Date of Patent: Sep. 13, 2022

(54) AIRCRAFT PRESSURE MEASUREMENT DEVICE INCLUDING AN ENHANCED CLEANING SYSTEM

(71) Applicant: Rosemount Aerospace Inc., Burnsville, MN (US)

(72) Inventors: Michael Robert Daup, Minneapolis, MN (US); Brian Brent Naslund, Chanhassen, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 17/302,436

(22) Filed: May 3, 2021

(51) Int. Cl.
*G01L 19/06* (2006.01)
*B64F 5/60* (2017.01)
*G01L 27/00* (2006.01)

(52) U.S. Cl.
CPC ............ *G01L 19/0627* (2013.01); *B64F 5/60* (2017.01); *G01L 27/007* (2013.01)

(58) Field of Classification Search
None
See application file for complete search history.

(56) References Cited

U.S. PATENT DOCUMENTS

| | | | | |
|---|---|---|---|---|
| 4,786,188 A | * | 11/1988 | Myhre | G01J 5/0818 356/43 |
| 5,003,295 A | * | 3/1991 | Kleven | B64D 15/20 340/581 |
| 10,829,194 B2 | * | 11/2020 | Wozniak | B64D 11/02 |

FOREIGN PATENT DOCUMENTS

FR 3089185 A1 11/2018

* cited by examiner

*Primary Examiner* — Brandi N Hopkins
*Assistant Examiner* — Nigel H Plumb
(74) *Attorney, Agent, or Firm* — Kinney & Lange, P.A.

(57) ABSTRACT

An aircraft pressure measurement device includes a pressure sensor, a pressure measurement path, a valve, and a fluid port. The pressure measurement path extends between an aircraft skin and the pressure sensor, and the valve is positioned within the pressure measurement path between the aircraft skin and the pressure sensor. The valve is configured to regulate airflow through the pressure measurement path, and the fluid port is configured to allow a pressurized fluid into the pressure measurement path to clear the pressure measurement path of debris. The improved pressure measurement device allows the aircraft to automatically clear debris from the pressure measurement path both during flight and while on the ground, removing the need for manual cleaning processes.

20 Claims, 5 Drawing Sheets

AIRCRAFT PRESSURE MEASUREMENT DEVICE INCLUDING AN ENHANCED CLEANING SYSTEM

BACKGROUND

The present disclosure relates generally to aircraft pressure measurement devices, and more particularly to methods and apparatus for clearing debris from aircraft pressure measurement devices.

Flush pressure ports are pressure ports positioned along the skin of an aircraft that are configured to gather air data measurements. Air from outside the aircraft skin enters the flush pressure ports and a pressure sensor within the aircraft gathers the air data measurements. Current flush pressure ports are subject to blockage due to the aircraft operating environment. More specifically, the flush pressure ports include small port holes for receiving air for pressure measurement. These small ports can become blocked by material such as sand, dust, ice, rain, de-icing fluid, insects, etc. This material is pulled into and becomes lodged in the small ports, blocking the air path and causing inaccurate pressure measurements by the pressure sensor. Current devices attempt to address this problem by using multiple ports to create a redundant pressure path to the pressure sensor. This approach offers only a temporary solution, as more ports become obstructed over the course of operation.

SUMMARY

According to one aspect of the disclosure, a pressure measurement device for use on an aircraft is disclosed. The pressure measurement device includes a pressure sensor positioned within the aircraft, a pressure measurement path, a valve, and a fluid port. The pressure measurement path extends between the pressure sensor and an air inlet situated at a skin of the aircraft. The pressure measurement path allows air to flow from outside the skin of the aircraft to the pressure sensor. The valve is fluidly coupled to the pressure measurement path between the skin of the aircraft and the pressure sensor. The fluid port is configured to supply a clearing fluid, and is selectively fluidly coupled to the pressure measurement path via the valve. The valve is actuatable between at least two states: a closed state wherein the fluid port is fluidly isolated from the pressure measurement path, and an open state wherein the fluid port is fluidly connected to the pressure measurement path.

According to another aspect of the disclosure, a method of clearing debris from a pressure measurement device positioned adjacent a skin of an aircraft is disclosed. The pressure measurement device includes a pressure measurement path connecting an inlet to an inboard pressure sensor. The method includes fluidly connecting a source of clearing fluid to the pressure measurement path at a location inboard of the inlet and between the inlet and the pressure sensor; flushing the debris out the inlet by flow of the clearing fluid through the pressure measurement path, toward the inlet; and fluidly decoupling the source of clearing fluid from the pressure measurement path.

DETAILED DESCRIPTION

Flush pressure ports are pressure ports positioned along the skin of an aircraft that are configured to gather air data measurements. Air from outside the aircraft skin flows into the flush pressure ports and a pressure sensor within the aircraft gathers the air data measurements. The present disclosure provides apparatus and methods for clearing obstructions from these flush pressure ports by directing clearing fluid outward through the flush pressure ports. Specifically, a valve is used to selectively fluidly connect the flush pressure ports with a clearing fluid source. Pressurized clearing fluid routed through this valve can expel or eject any debris within the pressure port outward, away from the skin of the aircraft into the surrounding environment.

Figure 1:
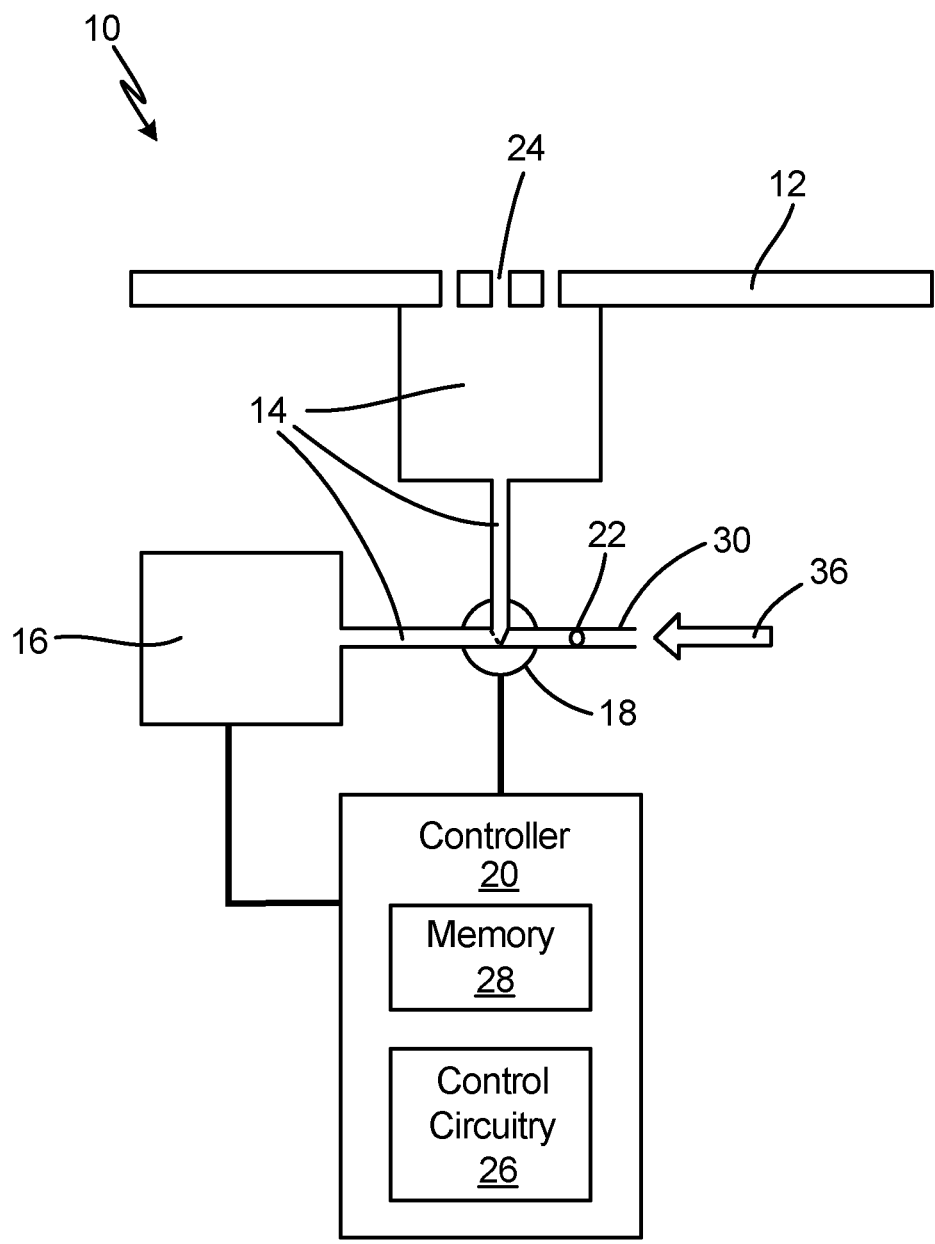
FIG. 1 is a schematic block diagram of a first embodiment of the pressure measurement device.

FIG. 1 is a schematic block diagram of a first embodiment of pressure measurement device 10. In some examples, pressure measurement device 10 is a flush pressure port positioned along aircraft skin 12 of an aircraft (not shown). Pressure measurement device 10 is configured to allow air from outside aircraft skin 12 to flow into pressure measurement device 10 to gather air data measurements during operation of the aircraft. In some examples, pressure measurement device 10 can be positioned within a nose section of an aircraft. In other examples, pressure measurement device 10 can be positioned at least partially within the aircraft at any location along aircraft skin 12. Aircraft skin 12 is a component of the aircraft that protects the interior of the aircraft from the outside operating environment. In some examples, aircraft skin 12 can be constructed from a metallic material. Pressure measurement device 10 will hereinafter be referred to as device 10.

Device 10 includes pressure measurement path 14, pressure sensor 16, valve 18, controller 20, and fluid port 22. Pressure measurement path 14 is a duct positioned fully within the body of the aircraft that allows air from outside the aircraft to flow within the body of the aircraft. More specifically, pressure measurement path 14 is a duct that extends from aircraft skin 12 to pressure sensor 16. Pressure measurement path 14 includes air inlet 24 positioned adjacent and extending through aircraft skin 12. In one example, air inlet 24 consists of a single aperture extending through aircraft skin 12. In another example, air inlet 24 includes a plurality of apertures extending through aircraft skin 12. Air inlet 24 is configured to allow a pressure volume of air disposed adjacent the exterior of aircraft skin 12 to flow into pressure measurement path 14 positioned within the aircraft. As such, pressure measurement path 14 is configured to provide a measurement path connecting air inlet 24 to pressure sensor 16.

Pressure sensor 16 is positioned within the body of the aircraft, such that pressure sensor 16 is positioned within an interior of aircraft skin 12. Pressure sensor 16 is a sensor that is configured to gather air pressure data during operation of the aircraft. In the example shown in FIG. 1, pressure sensor 16 is configured to gather the ambient atmospheric pressure of the aircraft during flight of the aircraft as well as while the aircraft is on the ground. In another example, pressure sensor 16 can be fluidly coupled through pressure measurement path 14 to a pitot probe coupled to and extending outwards from aircraft skin 12 to gather air velocity and incoming air pressure data during flight of the aircraft. In each example, pressure sensor 16 is positioned within aircraft skin 12, fluidly coupled through pressure measurement path 14 to air outside of aircraft skin 12, and configured to gather pressure data during operation of the aircraft. Although the preceding and following disclosure focuses on embodiments in which device 10 includes pressure sensor 16, it is to be understood that the present disclosure could also be applied to a total air temperature probe or an angle of attack probe in place of the pressure sensing system discussed herein. Further, although the preceding and following disclosure focus on embodiments in which device 10 includes a single air inlet 24, it is to be understood that the present disclosure could also be applied to a multifunction probe including multiple air inlets and/or multiple pressure pads for gathering multiple pressure measurements. In each embodiment, device 10 is configured to clear debris from pressure measurement path 14 and air inlet 24. With that said, the following disclosure will focus on the embodiment in which device 10 includes pressure sensor 16 with a single air inlet 24.

In the illustrated embodiment, valve 18 is a two-state valve fluidly coupled to pressure measurement path 14 between air inlet 24 of pressure measurement path 14 (adjacent aircraft skin 12) and pressure sensor 16. Specifically, valve 18 is a switch valve or analogous valving component situated at the intersection of pressure measurement path 14 and fluid port 22, which is fluidly coupled to clearing fluid line 30. Valve 18 is actuatable between a first (open) state and a second (closed) state. In the closed state, air inlet 24 is fluidly connected to pressure sensor 16 and fluid port 22 and clearing fluid line 30 are fluidly isolated from both pressure sensor 16 and air inlet 24. In the open state, air inlet 24 is fluidly connected to fluid port 22 and clearing fluid line 30, and pressure sensor 16 is fluidly isolated from fluid port 22, clearing fluid line 30, and air inlet 24. When valve 18 is in the closed state, a fluid tight seal within valve 18 prevents airflow within pressure measurement path 14 from entering fluid port 22 (shown as the solid line within valve 18). When valve 18 is in the open state, a fluid tight seal within valve 18 prevents clearing fluid within pressure measurement path 14 from interfacing with pressure sensor 16 (shown as the dashed line within valve 18). In other words, when valve 18 is in the closed state, fluid port 22 is fluidly isolated from pressure measurement path 14. When valve 18 is in the open state, fluid port 22 is fluidly connected to pressure measurement path 14, discussed further below.

In the example shown, controller 20 includes control circuitry 26 and memory 28. However, in certain examples, controller 20 can include more or fewer components than components 26 and 28. Control circuitry 26 is configured to implement functionality and/or process instructions for execution within controller 20. For instance, control circuitry 26 can be capable of processing instructions stored in memory 28. Examples of control circuitry 26 can include any one or more of a microprocessor, a digital signal processor (DSP), an application specific integrated circuit (ASIC), a field-programmable gate array (FPGA), or other equivalent discrete or integrated logic circuitry.

Memory 28 can be configured to store information within controller 20 during operation of device 10. Memory 28, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 28 is a temporary memory, meaning that a primary purpose of memory 28 is not long-term storage. Memory 28, in some examples, is described as volatile memory, meaning that memory 28 does not maintain stored contents when power to controller 20 is turned off. Examples of volatile memories can include random access memories (RAM), dynamic random-access memories (DRAM), static random-access memories (SRAM), and other forms of volatile memories. In some examples, memory 28 is used to store program instructions for execution by control circuitry 26. Memory 28, in one example, is used by software or applications running on controller 20 (e.g., a software program implementing a system architecture) to temporarily store information during program execution. Memory 28, in some examples, also includes one or more computer-readable storage media. Memory 28 can be configured to store larger amounts of information than volatile memory. Memory 28 can further be configured for long-term storage of information. In some examples, memory 28 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories. Although controller 20 is described herein as a unitary element, different functions of controller 20 can equivalently be distributed across multiple devices.

Controller 20 is operatively connected to valve 18 and pressure sensor 16 through a wired or wireless connection, as shown. Controller 20 is operatively connected to valve 18 to control operation of valve 18. More specifically, controller 20 is operatively connected to valve 18 to control the actuation of valve 18 between the closed state and the open state. For example, controller 20 is configured to send a command signal to valve 18 to initiate actuation of valve 18 from the closed state to the open state. Likewise, controller 20 is configured to send a command signal to valve 18 to initiate actuation of valve 18 from the open state to the closed state. In the closed state, valve 18 prevents airflow within pressure measurement path 14 from entering fluid port 22 (shown as the solid line within valve 18). In the open state, valve 18 prevents clearing fluid within pressure measurement path 14 from interfacing with pressure sensor 16 (shown as the dashed line within valve 18). As such, valve 18 interrupts pressure measurement path 14 to fluidly isolate pressure sensor 16 from air inlet 24 when in the open state and valve 18 connects pressure sensor 16 to air inlet 24 when in the closed state.

Controller 20 is operatively connected to pressure sensor 16 to receive air pressure data gathered by pressure sensor 16 and then store the received air pressure data within memory 28 for processing by control circuitry 26. Further, controller 20 can process to received air pressure data to determine the presence of debris (sand, dust, ice, rain, de-icing fluid, insects, etc.) within pressure measurement path 14 of device 10. Controller 20 can determine and indicate the presence of debris through several different approaches. In one approach, controller 20 compares the received air pressure data received from pressure sensor 16 to a projected air pressure. The projected air pressure can be based on historical pressure measurements, experimental pressure measurements, or theoretical pressure values, among other options. If the received pressure data deviates from the projected air pressure by a threshold value (a user input value), controller 20 can output an indication of the presence of debris within pressure measurement path 14. In another approach, controller 20 compares the air pressure data received from pressure sensor 16 to air pressure data received from an adjacent pressure sensor 16. If the received pressure data deviates from air pressure data received from an adjacent pressure sensor 16 by a threshold value (a user input value), controller 20 can output an indication of the presence of debris within pressure measurement path 14. The output indication can be an alarm, a light, or any other type of feedback that can be interpreted by a user to understand controller 20 has identified the presence of debris within pressure measurement path 14.

Fluid port 22 is positioned within the body of the aircraft, such that fluid port 22 is positioned within an interior of aircraft skin 12. Fluid port 22 is an aperture or inlet port that is fluidly coupled to pressure measurement path 14. Fluid port 22 can be any fluid aperture or inlet port that is fluidly sealed around its outer edges and surfaces to prevent fluid leakage from fluid port 22. Fluid port 22 is configured to supply a clearing fluid into pressure measurement path 14 to clear debris from pressure measurement path 14. The clearing fluid can be a cleaning solution, isopropyl alcohol, water, pressurized air, bleed air, or pressurized gas, among other options. As shown in FIG. 1, fluid port 22 is fluidly coupled to pressure measurement path 14 and fluidly separated from pressure sensor 16 by valve 18. As such, valve 18 allows clearing fluid to flow through fluid port 22, valve 18, and pressure measurement path 14. Concurrently, valve 18 prevents the clearing fluid flowing through fluid port 22 from reaching pressure sensor 16 by blocking or obstructing the measurement path to pressure sensor 16. Preventing the clearing fluid from reaching pressure sensor 16 is generally desired because it prevents damage to a diaphragm of pressure sensor 16, which extends the life pressure sensor 16 and avoids inaccurate pressure measurements by pressure sensor 16. The clearing fluid flowing through fluid port 22 and pressure measurement path 14 exits through air inlet 24 of pressure measurement path 14, expelling debris from pressure measurement path 14 as the clearing fluid exits air inlet 24.

In the example shown in FIG. 1, fluid port 22 is fluidly coupled to an engine air bleed disposed from a gas turbine engine (not shown) of the aircraft to supply bleed air as the clearing fluid to fluid port 22. In other words, fluid port 22 is fluidly coupled through a tube, channel, duct, or the like to bleed air source 36 on the aircraft, such as bleed air from the engine of the aircraft. The bleed air (clearing fluid) flows from bleed air source 36 (i.e. the aircraft engine) through the duct to fluid port 22. While valve 18 is in the open state, the bleed air can flow through fluid port 22 and then through pressure measurement path 14, exiting through air inlet 24 into the ambient environment. The bleed air flowing from bleed air source 36 and out air inlet 24 can be hot pressurized air. Therefore, the bleed air is configured to clear pressure measurement path 14 of any debris and the bleed air is configured to melt any ice particles present within pressure measurement path 14, as well as ice particles present at air inlet 24. As such, FIG. 1 shows an embodiment in which bleed air from bleed air source 36 within the aircraft is used as the clearing fluid to clear debris from pressure measurement path 14.

In operation, controller 20 continuously receives, stores, and processes pressure data from pressure sensor 16. Further, controller 20 continuously monitors the pressure data received from pressure sensor 16 to ensure device 10 is functioning properly. In the event that controller 20 identifies the presence of debris within pressure measurement path 14 of device 10, controller 20 transmits an output indication alerting the user (pilot or co-pilot) to the presence of the debris. As discussed, the output indication can be an alarm, a light, or any other type of feedback that can be interpreted by a user to understand controller 20 has identified the presence of debris within pressure measurement path 14. Upon notification, the user or an automated system can initiate clearing the debris from pressure measurement path 14. The user can initiate clearing the debris by interacting with a user interface to instruct controller 20 to send command signals to clear the debris. The user interface can be a graphical user interface, buttons, knobs, switches, or any other physical control element on the aircraft. The automated system can be a set of instructions stored within memory 28 of controller 20 that are implemented, without user input, upon receiving the notification of debris within pressure measurement path 14. In additional to clearing debris in response to identification of blockages, controller 20 can actuate valve 18 to flush debris as a part of regular or periodic maintenance.

To clear the debris from pressure measurement path 14, a source of clearing fluid is fluidly connected to pressure measurement path 14 at a location inboard of air inlet 24 and between air inlet 24 and pressure sensor 16. In the example shown in FIG. 1, bleed air source 36 is fluidly connected to fluid port 22, which is fluidly connected to pressure measurement path 14 through valve 18. Valve 18 receives a command signal from controller 20 to actuate valve 18 into the open state, allowing the bleed air to flow into pressure measurement path 14. The debris within pressure measurement path 14 is flushed out air inlet 24 by the bleed air flowing through pressure measurement path 14. More specifically, the bleed air (clearing fluid) flows from fluid port 22 toward air inlet 24 to flush the debris from within pressure measurement path out into the ambient environment. After the flushing has occurred and the debris has been forced out from pressure measurement path 14, controller 20 sends a command signal to valve 18 to actuate into the closed position. Controller 20 can, for example, command valve 18 to dwell for a preselected time in its open state to flush pressure measurement path 14 before returning to its closed state. Actuating valve 18 into the closed position decouples the clearing fluid source from pressure measurement path 14. Further, the decoupling allows air from outside aircraft skin 12 to begin flowing through air inlet 24 into pressure measurement path 14 and to pressure sensor 16. Device 10 including valve 18, fluid port 22, and a clearing fluid source allows the aircraft to automatically clear debris from pressure measurement path 14 (flush pressure ports) both during flight and while on the ground, removing the need for manual cleaning processes.

Figure 2:
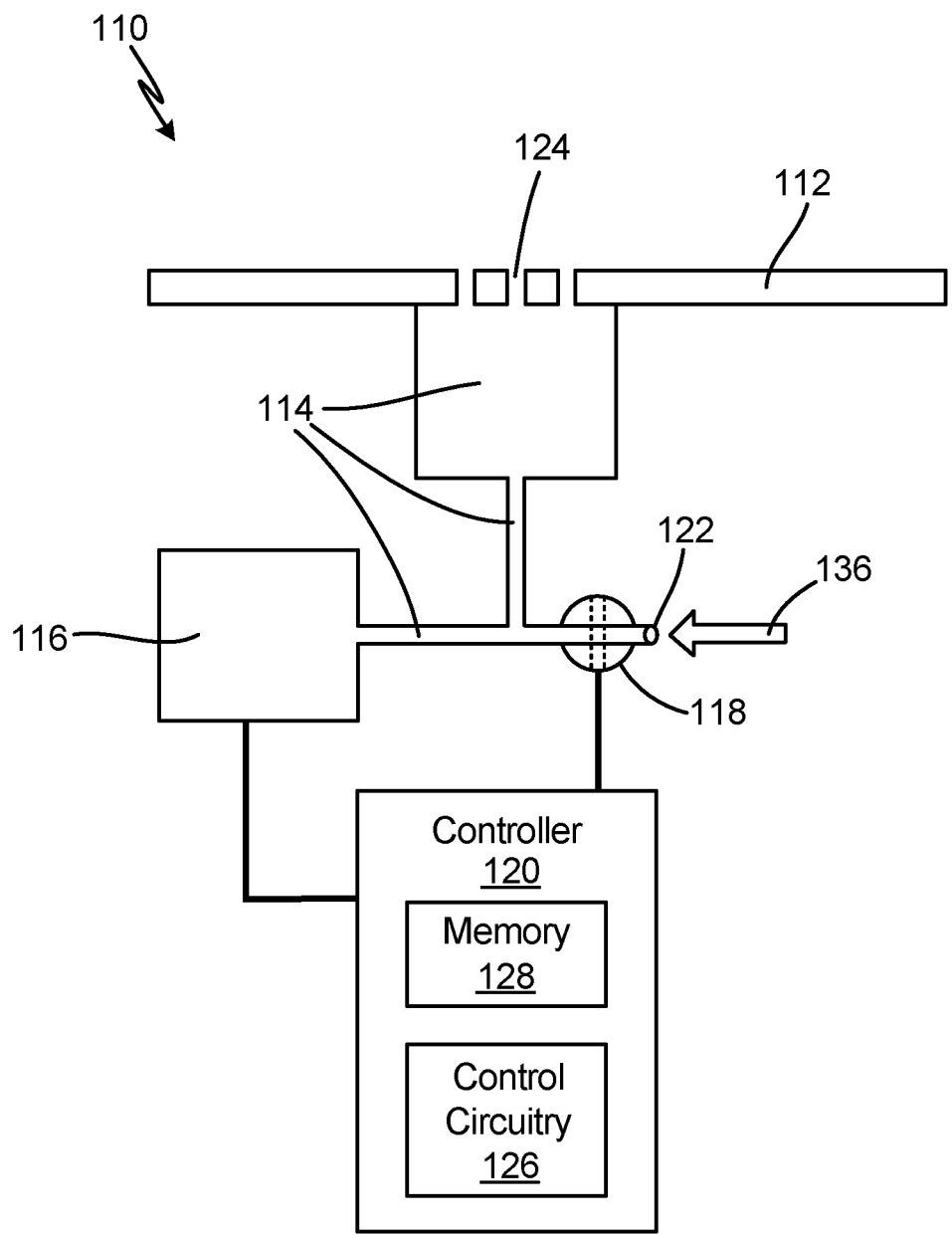
FIG. 2 is a schematic block diagram of a second embodiment of the pressure measurement device.

FIG. 2 is a schematic block diagram of a second embodiment of aircraft pressure measurement device 110, hereinafter referred to as device 110. Device 110 includes pressure measurement path 114, pressure sensor 116, valve 118, controller 120, and fluid port 122. Device 110 is substantially similar to device 10 of FIG. 1, such that a discussion of device 10 is understood to apply to device 110, except where noted. The operation of device 110 is nearly identical to device 10 of FIG. 1, except for the operation of valve 118. Therefore, to avoid redundancy, a discussion of each component of device 110 will not be presented below. Rather, a discussion of only the operation of valve 118 will be present below.

Valve 118 is fluidly coupled to pressure measurement path 114 between air inlet 124 of pressure measurement path 114

(adjacent aircraft skin 112) and pressure sensor 116. Further, valve 118 is disposed adjacent pressure measurement path 114, such that pressure measurement path 114 is not interrupted by valve 118. Valve 118 is configured to allow or prevent a clearing fluid from flowing though pressure measurement path 114. Valve 118 can be any valving mechanism including a fluid tight seal that is actuatable between at least two states, such as for example an open state and a closed state. When valve 118 is in the closed state, a fluid tight seal within valve 118 prevents the clearing fluid from entering pressure measurement path 114 (shown as the dashed lines within valve 118). When valve 118 is in the open state, clearing fluid can flow into pressure measurement path 114 (shown as the solid lines within valve 118). In other words, when valve 118 is in the closed state, fluid port 122 is fluidly isolated from pressure measurement path 114. When valve 118 is in the open state, fluid port 122 is fluidly connected to pressure measurement path 114.

In the example shown in FIG. 2, fluid port 122 is fluidly coupled to an air bleed disposed from an engine of the aircraft to supply bleed air as the clearing fluid to fluid port 122. In other words, fluid port 122 is fluidly coupled through a tube, channel, duct, or the like to bleed air source 136 on the aircraft, such as bleed air from the engine of the aircraft. The bleed air (clearing fluid) flows from bleed air source 136 (i.e. the aircraft engine) through the duct to fluid port 122. If valve 118 is in the closed state, the bleed air is prevented from flowing into pressure measurement path 114. If valve 118 is in the open state, the bleed air can flow through fluid port 122 and then through pressure measurement path 114, exiting through air inlet 124 into the ambient environment. The bleed air flowing from bleed air source 136 and out air inlet 124 can be hot pressurized air. Therefore, the bleed air is configured to clear pressure measurement path 114 of any debris and the bleed air is configured to melt any ice particles present within pressure measurement path 114, as well as ice particles present at air inlet 124. As such, FIG. 2 shows an embodiment in which bleed air from bleed air source 136 within the aircraft is used as the clearing fluid to clear debris from pressure measurement path 114.

Valve 118 is configured to be either in the open state or the closed state, allowing or preventing clearing fluid from flowing into pressure measurement path 114, respectively. Valve 118 does not prevent any fluids (clearing fluid or ambient air) from interacting with pressure sensor 116. As such, when valve 118 is in the open state, the clearing fluid will flow through pressure measurement path 114 to pressure sensor 116. The clearing fluid flowing through pressure measurement path 114 is generally a pressurized fluid. Therefore, pressure sensor 116 of device 110 includes a robust diaphragm that is configured to withstand the fluid pressures of the clearing fluid without rupturing or becoming damaged. As such, clearing fluid flowing through fluid port 122 will flow through pressure measurement path 114 to pressure sensor 116 and to air inlet 24,' clearing debris from pressure measurement path 114.

Figure 3:
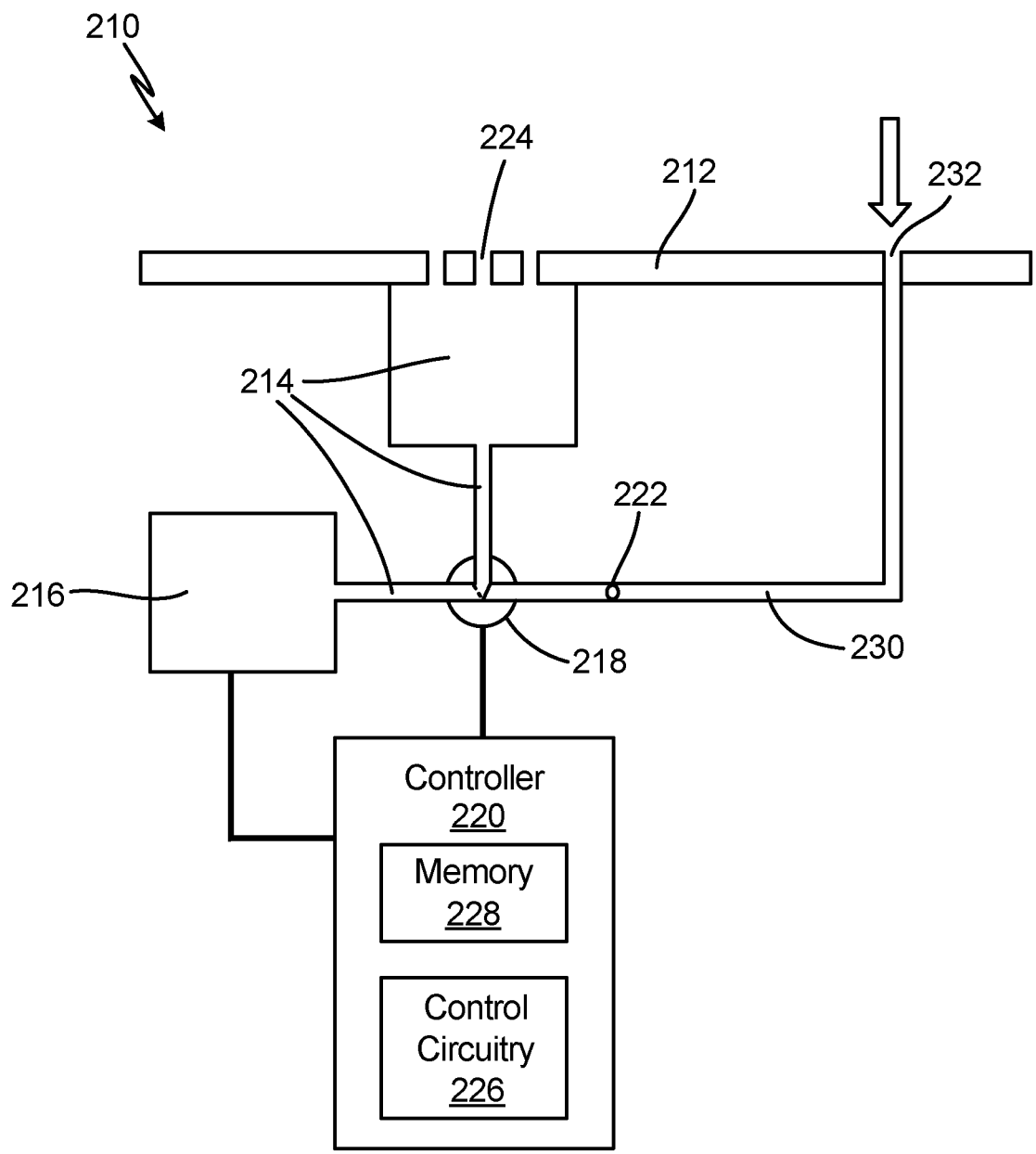
FIG. 3 is a schematic block diagram of a third embodiment of the pressure measurement device.

FIG. 3 is a schematic block diagram of a third embodiment of aircraft pressure measurement device 210, hereinafter referred to as device 210. Device 210 includes pressure measurement path 214, pressure sensor 216, valve 218, controller 220, fluid port 222, clearing fluid line 230, and maintenance port 232. Device 210 is substantially similar to device 10 of FIG. 1, such that a discussion of device 10 is understood to apply to device 210, except where noted. The operation of device 210 is nearly identical to device 10 of FIG. 1, except for the inclusion of clearing fluid line 230, maintenance port 232, and the source of the clearing fluid. Therefore, to avoid redundancy, a discussion of each component of device 210 will not be presented below. Rather, a discussion of only clearing fluid line 230, maintenance port 232, and the source of the clearing fluid will be present below.

Maintenance port 232 is positioned adjacent and extending through aircraft skin 212. Maintenance port 232 is an aperture or inlet port that is fluidly coupled to fluid port 222 through clearing fluid line 230. Maintenance port 232 can be any fluid aperture or inlet port that is fluidly sealed around its outer edges and surfaces to prevent fluid leakage from maintenance port 232. Maintenance port 232 is configured to be a location/component in which aircraft ground maintenance crews can attach flushing equipment to maintenance port 232 to flush pressure measurement path 214 to clear debris from pressure measurement path 214. More specifically, an aircraft ground maintenance crew can attach a mating attachment component, of a piece of ground flushing equipment, to maintenance port 232 to fluidly couple the ground flushing equipment and maintenance port 232. Maintenance port 232 is then configured to supply a clearing fluid through clearing fluid line 230 to fluid port 222, which is used to clear debris from pressure measurement path 214. The clearing fluid can be a cleaning solution, isopropyl alcohol, water, pressurized air, bleed air, or pressurized gas, among other options. The clearing fluid flowing through fluid port 222 and pressure measurement path 214 exits through air inlet 224 of pressure measurement path 214, clearing debris from pressure measurement path 214 as the clearing fluid exits air inlet 224. As such, FIG. 3 shows an embodiment in which the clearing fluid is supplied by ground flushing equipment into maintenance port 232, then the clearing fluid is used to clear debris from pressure measurement path 14 while the aircraft is on the ground.

Figure 4:
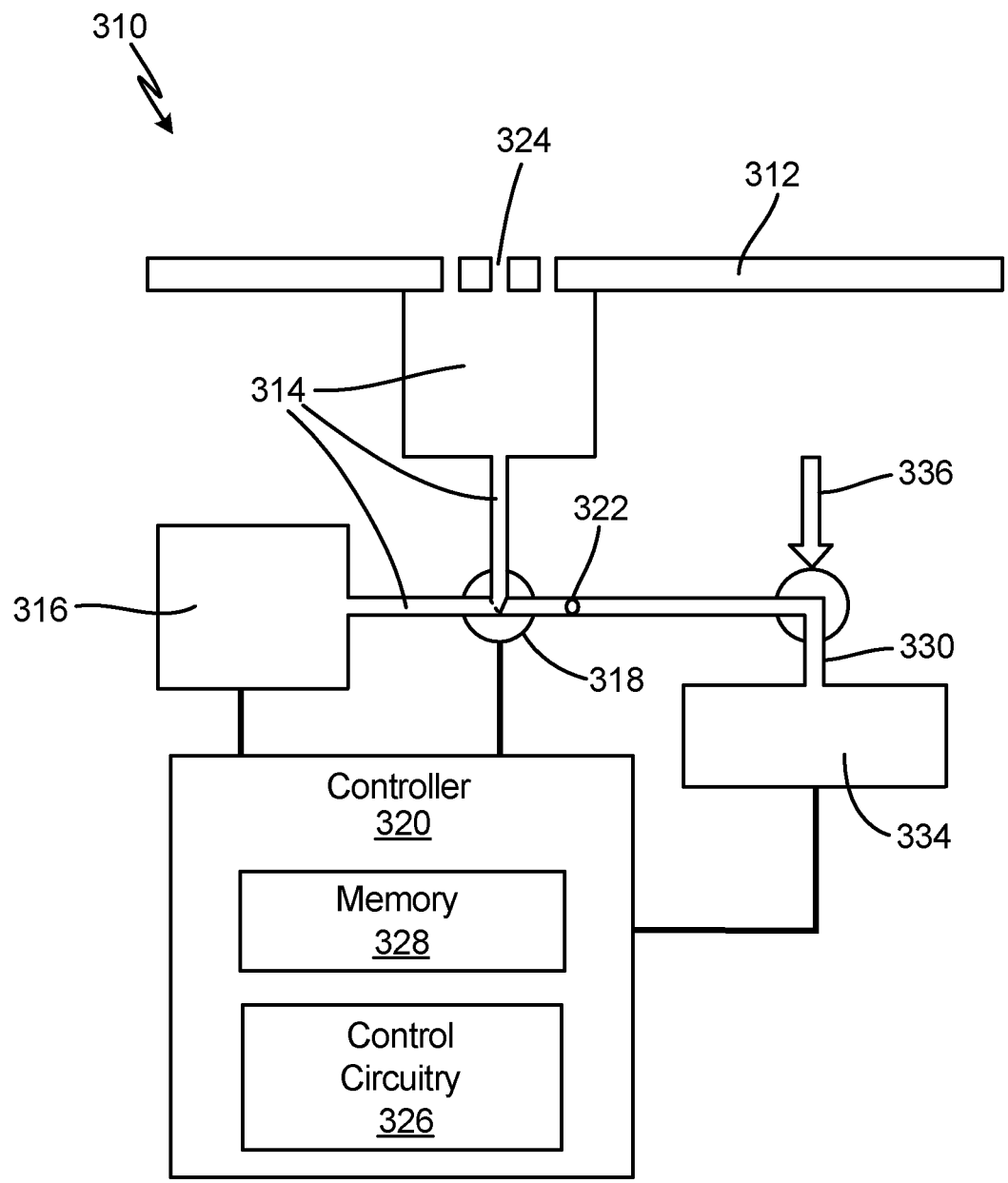
FIG. 4 is a schematic block diagram of a fourth embodiment of the pressure measurement device.

FIG. 4 is a schematic block diagram of a fourth embodiment of aircraft pressure measurement device 310, hereinafter referred to as device 310. Device 310 includes pressure measurement path 314, pressure sensor 316, valve 318, controller 320, fluid port 322, clearing fluid line 330, and fluid reservoir 334. Device 310 is substantially similar to device 10 of FIG. 1, such that a discussion of device 10 is understood to apply to device 310, except where noted. The operation of device 310 is nearly identical to device 10 of FIG. 1, except for the inclusion of clearing fluid line 330 and fluid reservoir 334. Therefore, to avoid redundancy, a discussion of each component of device 310 will not be presented below. Rather a discussion of only clearing fluid line 330 and fluid reservoir 334 will be present below.

Fluid reservoir 334 is positioned within the body of the aircraft, such that fluid reservoir 334 is positioned within aircraft skin 312. Fluid reservoir 334 is a tank, container, vessel, or any other storage container that is configured to store and contain clearing fluid that is used to clear debris from pressure measurement path 314. Fluid reservoir 334 is fluidly coupled through clearing fluid line 330 to fluid port 322, such that fluid can flow from fluid reservoir 334 through clearing fluid line 330 and to fluid port 322. As such, fluid reservoir 334 is configured to supply the clearing fluid to fluid port 322, which is then used to clear debris from pressure measurement path 314. In one example, fluid reservoir 334 is a compressed air tank that is configured to store compressed air as the clearing fluid. In another example, fluid reservoir 334 is a compressed gas tank that is configured to store compressed gas, other than air, as the clearing fluid. In yet another example, fluid reservoir 334 is a liquid tank that is configured to store a liquid as the clearing fluid. Therefore, the clearing fluid can be a cleaning solution, isopropyl alcohol, water, pressurized air, bleed air, or pressurized gas, among other options.

In operation, controller 320 sends a command signal to the operatively coupled fluid reservoir 334, actuating a valve of fluid reservoir 334 into an open position. Once in the open position, the clearing fluid contained within fluid reservoir 334 flows through clearing fluid line 330 to fluid port 322. If valve 318 is in the closed state, the clearing is prevented from flowing into pressure measurement path 314. If valve 318 is in the open state, the clearing fluid can flow through fluid port 322 and then through pressure measurement path 314, exiting air inlet 324 into the ambient environment. The clearing fluid flowing from fluid reservoir 334 and out air inlet 324 is configured to clear pressure measurement path 314 of any debris. Further, bleed air source 336 can be fluidly coupled to clearing fluid line 330. Bleed air source 336 is configured to clear pressure measurement path 314 of any liquid remnants present within pressure measurement path 314 after the liquid has been used to flush pressure measurement path 314. As such, bleed air source 336 further clears pressure measurement path 314 of any remaining debris after a liquid has been used to clear the debris. Bleed air source 336 ensures that liquid does not freeze within pressure measurement path 314, which could cause inaccurate pressure measurement data readings by pressure sensor 316. As such, FIG. 4 shows an embodiment in which a clearing fluid from fluid reservoir 334 and bleed air from bleed air source 336 are used to clear debris from pressure measurement path 314.

Figure 5:
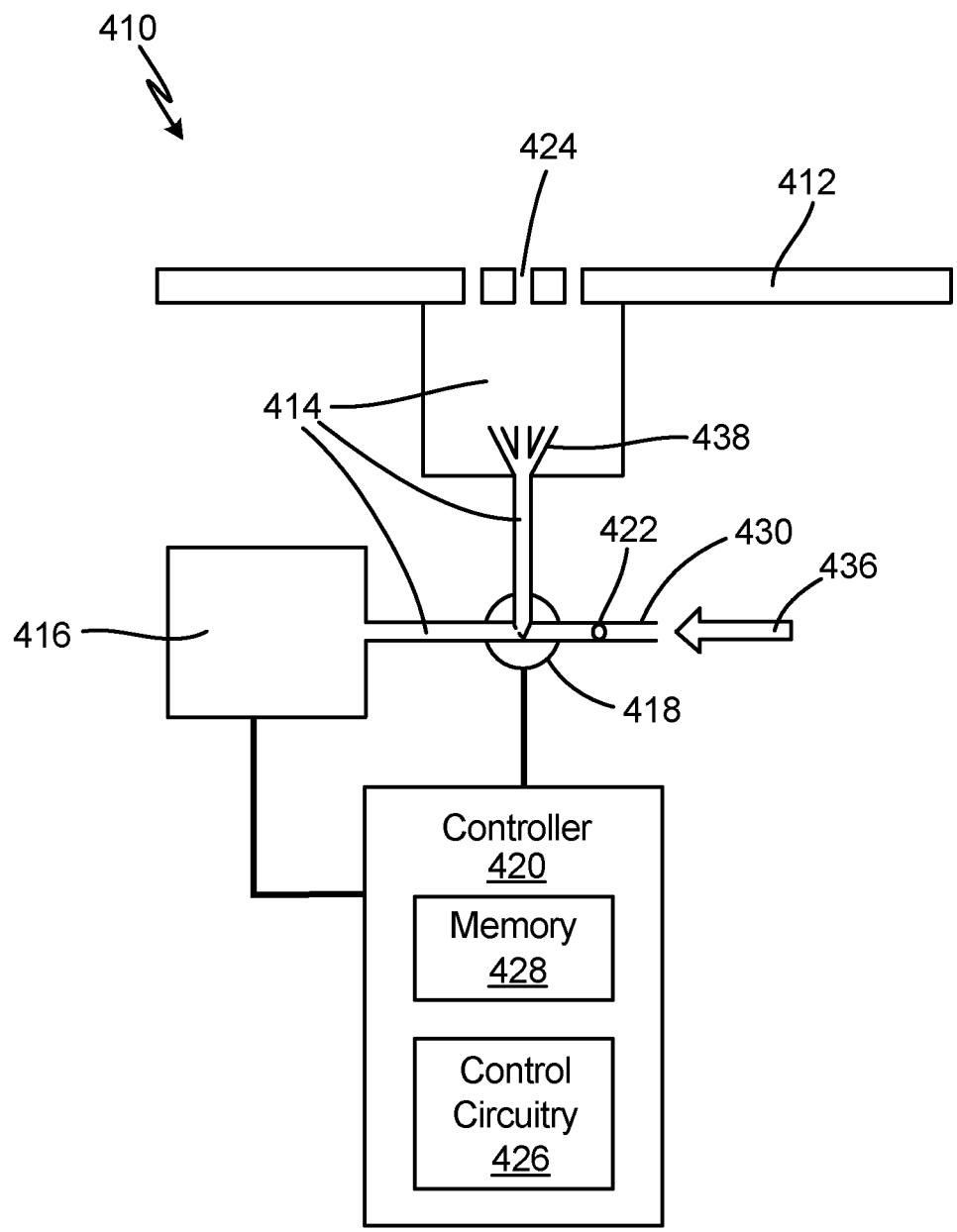
FIG. 5 is a schematic block diagram of a fifth embodiment of the pressure measurement device.

FIG. 5 is a schematic block diagram of a fifth embodiment of aircraft pressure measurement device 410, hereinafter referred to as device 410. Device 410 includes pressure measurement path 414, pressure sensor 416, valve 418, controller 420, and fluid port 422. Device 410 is substantially similar to device 10 of FIG. 1, such that a discussion of device 10 is understood to apply to device 410, except where noted. The operation of device 410 is nearly identical to device 10 of FIG. 1, except for the addition of nozzle 438. Therefore, to avoid redundancy, a discussion of each component of device 410 will not be presented below. Rather, a discussion of only the operation of nozzle 438 will be present below.

Nozzle 438 is positioned with the body of the aircraft, such that nozzle 438 is positioned within aircraft skin 412. Further, nozzle 438 is positioned within pressure measurement path 414 and coupled to pressure measurement path 414 at a location leading to pressure sensor 416. In other words, nozzle 438 is positioned within and coupled to pressure measurement path 414 between valve 418 and air inlet 424 adjacent aircraft skin 412. Nozzle 438 can be any component/device that is configured to control the direction and characteristics of pressurized clearing fluid flowing through pressure measurement path 414 toward air inlet 424. Nozzle 438 is configured to increase the pressure and velocity of the clearing fluid flowing through pressure measurement path 414 while also directing the clearing fluid flow toward specific apertures of air inlet 424. In the example shown in FIG. 5, there are three nozzles 438 shown directing clearing fluid flow to each of the three apertures shown for air inlet 424. In another example, there can be more or less than three nozzles 438 directing clearing fluid flow to more or less than three apertures of air inlet 424. It is to be understand that there can be any number of nozzles 438 directly clearing fluid to any number of apertures of air inlet 424. Nozzle 438 can be utilized to increase cleaning/ clearing capabilities of device 10 by increasing pressure, increasing velocity, and/or directing the clearing fluid to specific locations of air inlet 424. Nozzle 438 is an additional component that can be included in some embodiments and not included in other embodiments.

In each of the embodiments described device 10 (including devices 110, 210, 310, and 410) clears debris from pressure measurement path 14 by forcing a pressurized clearing fluid from within the aircraft through pressure measurement path 14 and out air inlet 24. The pressure of the pressurized clearing fluid can vary but is above atmospheric pressure. In one example, the pressurized clearing fluid flowing through pressure measurement path 14 has a pressure of 1.5 to 2 times atmospheric pressure. In another example, the pressurized clearing fluid flowing through pressure measurement path 14 has a pressure of at least 2 times atmospheric pressure. In yet another example, the pressurized clearing fluid flowing through pressure measurement path 14 has a pressure of 1.5 to 2 times the input pressure at air inlet 24, for example when used with a pitot probe. In each example, the pressurized clearing fluid has a pressure that is greater than atmospheric pressure to expel debris from within pressure measurement path 14 into the ambient environment.

Device 10 including valve 18, fluid port 22, and a clearing fluid source allows the aircraft to automatically clear debris from pressure measurement path 14 (flush pressure ports) both during flight and while on the ground, removing the need for manual cleaning processes. As such, device 10 reduces maintenance costs for the aircraft due to the elimination of the manual cleaning process. Device 10 also provides more consistent performance by avoiding latent failures due to pressure line contamination. Device 10 ensures flush pressure sensors on the aircraft are not blocked by debris and are providing accurate pressure measurement data. Device 10 has many other advantages, not specifically described, that will be appreciated by those skilled in the art.

Discussion of Possible Embodiments

The following are non-exclusive descriptions of possible embodiments of the present invention.

A pressure measurement device for use on an aircraft is disclosed. The pressure measurement device includes a pressure sensor positioned within the aircraft, a pressure measurement path, a valve, and a fluid port. The pressure measurement path extends between the pressure sensor and an air inlet situated at a skin of the aircraft. The pressure measurement path allows air to flow from outside the skin of the aircraft to the pressure sensor. The valve is fluidly coupled to the pressure measurement path between the skin of the aircraft and the pressure sensor. The fluid port is configured to supply a clearing fluid, and is selectively fluidly to the pressure measurement path via the valve. The valve is actuatable between at least two states: a closed state wherein the fluid port is fluidly isolated from the pressure measurement path, and an open state wherein the fluid port is fluidly connected to the pressure measurement path.

The pressure measurement device of the preceding paragraph can optionally include, additionally and/or alternatively, any one or more of the following features, configurations and/or additional components:

A maintenance port extending through the skin of the aircraft, wherein the maintenance port is fluidly coupled via a clearing fluid line to the fluid port as a source of the clearing fluid.

A fluid reservoir positioned within the aircraft, wherein: the fluid reservoir is configured to store the clearing fluid; the fluid reservoir is fluidly coupled to the pressure fluid port via a clearing fluid line; and the fluid reservoir is configured to supply the fluid into the pressure measurement path to clear debris from the pressure measurement path.

The fluid reservoir is a compressed air tank configured to store compressed air as the clearing fluid.

The fluid reservoir is a liquid tank configured to store a liquid as the clearing fluid.

A pitot probe coupled to an exterior of the skin of the aircraft and fluidly coupled to the pressure measurement path.

An air bleed disposed from an engine of the aircraft to supply bleed air as the clearing fluid to the fluid port.

The inlet includes at least one aperture extending through the skin of the aircraft.

The inlet further comprises a pressure volume disposed adjacent the aircraft skin, and the at least one aperture comprises a plurality of apertures extending through the skin of the aircraft to the pressure volume.

The clearing fluid is one or more of a cleaning solution, isopropyl alcohol, water, pressurized air, and pressurized gas.

The valve interrupts the pressure measurement path, such that the valve fluidly isolates the pressure sensor from the inlet in the open state, and fluidly connects the pressure sensor to the inlet in the closed state.

The valve is disposed adjacent the pressure measurement path, such that the pressure measurement path is not interrupted by the valve.

The following are further non-exclusive descriptions of possible embodiments of the present invention.

A method of clearing debris from a pressure measurement device positioned adjacent a skin of an aircraft is disclosed. The pressure measurement device includes a pressure measurement path connecting an inlet to an inboard pressure sensor. The method includes fluidly connecting a source of clearing fluid to the pressure measurement path at a location inboard of the inlet and between the inlet and the pressure sensor; flushing the debris out the inlet by flow of the clearing fluid through the pressure measurement path, toward the inlet; and fluidly decoupling the source of clearing fluid from the pressure measurement path.

The method of the preceding paragraph can optionally include, additionally and/or alternatively, any one or more of the following features, configurations and/or additional components:

The decoupling is achieved by actuating a valve into a closed state to block the source of clearing fluid from the pressure measurement path.

The valve is fluidly coupled to the pressure measurement path between the skin of the aircraft and the pressure sensor.

The valve interrupts the pressure measurement path, such that the valve fluidly isolates the pressure sensor from the inlet in an open state, and fluidly connects the pressure sensor to the inlet in the closed state.

A controller is operatively coupled to the valve, and wherein the controller is configured to send command signals to the valve to initiate actuating the valve into the closed state.

Receiving, by a controller, air pressure data from the pressure sensor indicating the presence of debris within the pressure measurement path.

The pressure sensor indicating the presence of debris within the pressure measurement path of the pressure measurement device comprises: comparing, by the controller, the received air pressure data to a projected air pressure; establishing, by the controller, the received air pressure data deviates from the projected air pressure data by a threshold value; and outputting, by the controller, an indication of the presence of debris within the pressure measurement path.

The pressure sensor indicating the presence of debris within the pressure measurement path of the pressure measurement device comprises: comparing, by the controller, the received air pressure data to air pressure data received from an adjacent pressure sensor; establishing, by the controller, the air pressure data of adjacent pressure sensors deviates by a threshold value; and outputting, by the controller, an indication of the presence of debris within the pressure measurement path.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pressure measurement device for use on an aircraft, the pressure measurement device comprising:
    a pressure sensor positioned within the aircraft;
    a pressure measurement path extending between the pressure sensor and an air inlet situated at a skin of the aircraft, wherein the pressure measurement path allows air to flow from outside the skin of the aircraft to the pressure sensor;
    a valve fluidly coupled to the pressure measurement path between the skin of the aircraft and the pressure sensor; and
    a fluid port configured to supply a clearing fluid, and selectively fluidly coupled to the pressure measurement path via the valve,
    wherein the valve is actuatable between at least two states: a closed state wherein the fluid port is fluidly isolated from the pressure measurement path, and an open state wherein the fluid port is fluidly connected to the pressure measurement path.

2. The pressure measurement device of claim 1, further comprising a maintenance port extending through the skin of the aircraft, wherein the maintenance port is fluidly coupled via a clearing fluid line to the fluid port as a source of the clearing fluid.

3. The pressure measurement device of claim 1, further comprising a fluid reservoir positioned within the aircraft, wherein:
    the fluid reservoir is configured to store the clearing fluid;
    the fluid reservoir is fluidly coupled to the pressure fluid port via a clearing fluid line; and
    the fluid reservoir is configured to supply the fluid into the pressure measurement path to clear debris from the pressure measurement path.

4. The pressure measurement device of claim 3, wherein the fluid reservoir is a compressed air tank configured to store compressed air as the clearing fluid.

5. The pressure measurement device of claim 3, wherein the fluid reservoir is a liquid tank configured to store a liquid as the clearing fluid.

6. The pressure measurement device of claim 1 and further comprising a pitot probe coupled to an exterior of the skin of the aircraft and fluidly coupled to the pressure measurement path.

7. The pressure measurement device of claim 1, further comprising an air bleed disposed from an engine of the aircraft to supply bleed air as the clearing fluid to the fluid port.

8. The pressure measurement device of claim 1, wherein the inlet includes at least one aperture extending through the skin of the aircraft.

9. The pressure measurement device of claim 1, wherein the inlet further comprises a pressure volume disposed adjacent the aircraft skin, and the at least one aperture comprises a plurality of apertures extending through the skin of the aircraft to the pressure volume.

10. The pressure measurement device of claim 1, wherein the clearing fluid is one or more of a cleaning solution, isopropyl alcohol, water, pressurized air, and pressurized gas.

11. The pressure measurement device of claim 1, wherein the valve interrupts the pressure measurement path, such that the valve fluidly isolates the pressure sensor from the inlet in the open state, and fluidly connects the pressure sensor to the inlet in the closed state.

12. The pressure measurement device of claim 1, wherein the valve is disposed adjacent the pressure measurement path, such that the pressure measurement path is not interrupted by the valve.

13. A method of clearing debris from a pressure measurement device positioned adjacent a skin of an aircraft, the pressure measurement device comprising a pressure measurement path connecting an inlet to an inboard pressure sensor, the method comprising:
fluidly connecting a source of clearing fluid to the pressure measurement path at a location inboard of the inlet and between the inlet and the pressure sensor;
flushing the debris out the inlet by flow of the clearing fluid through the pressure measurement path, toward the inlet; and
fluidly decoupling the source of clearing fluid from the pressure measurement path.

14. The method of claim 13, wherein the decoupling is achieved by actuating a valve into a closed state to block the source of clearing fluid from the pressure measurement path.

15. The method of claim 14, wherein the valve is fluidly coupled to the pressure measurement path between the skin of the aircraft and the pressure sensor.

16. The method of claim 14, wherein the valve interrupts the pressure measurement path, such that the valve fluidly isolates the pressure sensor from the inlet in an open state, and fluidly connects the pressure sensor to the inlet in the closed state.

17. The method of claim 14, wherein a controller is operatively coupled to the valve, and wherein the controller is configured to send command signals to the valve to initiate actuating the valve into the closed state.

18. The method of claim 13, further comprising receiving, by a controller, air pressure data from the pressure sensor indicating the presence of debris within the pressure measurement path.

19. The method of claim 18, wherein the pressure sensor indicating the presence of debris within the pressure measurement path of the pressure measurement device comprises:
comparing, by the controller, the received air pressure data to a projected air pressure;
establishing, by the controller, the received air pressure data deviates from the projected air pressure data by a threshold value; and
outputting, by the controller, an indication of the presence of debris within the pressure measurement path.

20. The method of claim 18, wherein the pressure sensor indicating the presence of debris within the pressure measurement path of the pressure measurement device comprises:
comparing, by the controller, the received air pressure data to air pressure data received from an adjacent pressure sensor;
establishing, by the controller, the air pressure data of adjacent pressure sensors deviates by a threshold value; and
outputting, by the controller, an indication of the presence of debris within the pressure measurement path.

* * * * *